United States Patent [19]

May

[11] 4,000,355

[45] Dec. 28, 1976

[54] PRODUCTION OF VINYL CHLORIDE RESINS WITH SHORT DRY-BLEND TIME

[75] Inventor: William P. May, Pottstown, Pa.

[73] Assignee: The Firestone Tire & Rubber Company, Akron, Ohio

[22] Filed: Feb. 24, 1975

[21] Appl. No.: 552,088

[52] U.S. Cl. ............................. 526/200; 526/1; 526/5; 526/206; 526/210; 526/344

[51] Int. Cl.$^2$ ................. C08F 1/80; C08F 1/11; C08F 1/60; C08F 3/30

[58] Field of Search ............ 260/92.8 W, 85.5 XA, 260/87.1, 86.3; 526/200, 210, 344, 345

[56] References Cited

UNITED STATES PATENTS

| | | | |
|---|---|---|---|
| 3,488,328 | 1/1970 | Koyanagi | 260/78.5 |
| 3,671,508 | 6/1972 | Koyanagi | 260/87.1 |
| 3,691,080 | 9/1972 | Bauer | 260/78.5 CL |
| 3,706,722 | 12/1972 | Nelson | 260/85.5 ZA |

*Primary Examiner*—Christopher A. Henderson

[57] ABSTRACT

Vinyl chloride resins characterized by rapid dry blending with plasticizers are prepared by suspension polymerization in an aqueous medium containing a hydroxypropyl cellulose plus higher fatty acid esters of sorbitan.

4 Claims, No Drawings

PRODUCTION OF VINYL CHLORIDE RESINS WITH SHORT DRY-BLEND TIME

THE BACKGROUND AND PRIOR ART RELEVANT TO THE INVENTION

In the fabrication of vinyl chloride resins by calendering, extrusion, die-coating, etc., the resins are first mechanically blended with liquid plasticizers. The particles of resin imbibe the liquid plasticizers substantially completely, so that the granular resin retains its flowable character. This process is called "dry-blending", and it is very desirable that the resins shall be of such character that they will quickly imbibe the plasticizers, so as to minimize the time in the blending equipment. Such desirable resins are referred to as having short "dry-blend" times.

A patent to Nelson et al U.S. Pat. No. 3,706,722 discloses the preparation of plasticizer-absorbent resins by a process in which vinyl chloride is initially polymerized as the external phase to an internal aqueous phase containing sorbitan stearate plus hydroxypropyl methyl cellulose ether. After the initial polymerization, additional aqueous medium is added, causing a phase inversion, and the polymerization is carried to completion. This process is inherently cumbersome and difficult to control.

Accordingly, it is the object of this invention to provide a process for the production of vinyl chloride resins having short dry blend times, without having recourse to the cumbersome phase-reversal process of the prior art.

SYNOPSIS OF THE INVENTION

The above and other objects are secured, in accordance with this invention, by polymerizing vinyl chloride, at all times in suspension as the internal phase, in an aqueous medium containing dissolved therein:

|  | Parts by weight per 100 parts of vinyl chloride monomers |
|---|---|
| A hydroxypropyl cellulose | .11 – .60 |
| A higher fatty acid ester of sorbitan | .33 – .50 |

The reaction mass will contain a free radical initiator which is soluble in the vinyl chloride. Optionally, also, the aqueous medium may contain dissolved therein other colloidal suspending agents, such as methyl cellulose and the like. The temperature must not be allowed to rise above about 43° C. during the polymerization.

DESCRIPTION OF THE PREFERRED EMBODIMENTS

The Hydroxypropyl Cellulose

This material is to be distinguished from the hydroxypropyl methyl cellulose employed in Nelson et al U.S. Pat. No. 3,706,722, which contains methoxy groups in addition to hydroxypropyl groups. The hydroxypropyl cellulose used in the present invention is prepared by the reaction of propylene oxide with cellulose in the manner described in the "Encyclopedia of Polymer Science and Technology" (Jno. Wiley and Sons, 1965) Volume 3, pages 497 and 498, the methyl chloride being omitted. The amount of propylene oxide reacted should be such that the MS* will be in the range 3–4. The viscosity, which reflects the molecular weight, should be in the range 50–1,000 centipoises for a 5% by weight aqueous solution.

*MS is defined as the average number of molecules of propylene oxide combined per anhydroglucose unit.

The Sorbitan Fatty Acid Ester

This may be any monoester of a fatty acid containing 8–20 carbon atoms with commercial sorbitan, which is a mixture of 1,4-sorbitan with isosorbide produced by dehydration of sorbitol. Suitable esters will thus include sorbitan monolaurate, sorbitan monostearate, sorbitan monooleate, sorbitan monopalmitate, sorbitan monooctoate, sorbitan monomyristate, sorbitan monoarachidate, and mixtures of such esters such as sorbitan monoesters of the mixed fatty acids produced by hydrolysis of natural oils such as coconut oil, tallow, corn oil, etc.

The Polymerization Procedure

The polymerization procedure proceeds along the usual line of aqueous suspension practice, without any troublesome departures such as phase inversion or the like. Conveniently, the aqueous medium is prepared first. The appropriate amount of water, generally from 60 to 200 parts by weight per 100 parts by weight of the vinyl chloride to be polymerized, is charged into a polymerization vessel, and the hydroxypropyl cellulose and sorbitan fatty ester dissolved therein. There may advantageously, but not necessarily, be charged supplemental suspending agents such as hydroxypropyl methyl cellulose, methyl cellulose, hydroxyethyl cellulose, gelatin, and the like. It is recommended that the sum of the weights of the sorbitan ester, hydroxypropyl cellulose and supplemental suspending agents (if used) should be 0.44–1.5 parts by weight per 100 parts by weight of vinyl chloride. The catalyst is then charged, for instance, as a solution in a hydrocarbon solvent. The catalyst must be one which will be soluble in the monomer phase, such as diisopropyl peroxy perdicarbonate, benzoyl peroxide, lauroyl peroxide, tertiary butyl peroxypivalate, acetylcyclohexane sulfonyl peroxide, alpha, alpha'-azobis (isobutyronitrile), alpha, alpha'-azobis (alpha, gamma-dimethyl valeronitrile), sec-butyl peroxydicarbonate, and 2-ethylhexyl peroxydicarbonate and the like. The vessel is then purged, the vinyl chloride charged in, and agitation commenced so as to disperse the vinyl chloride as droplets in the aqueous medium. This relationship between the vinyl chloride and aqueous medium — i.e., the vinyl chloride as internal phase dispersed in the aqueous medium as external phase — is established at the outset of the polymerization, and is maintained throughout the polymerization reaction to follow. The temperature of the system must be kept below about 43° C. during the polymerization, as otherwise the resin produced does not have the desirable rapid plasticizer absorption which it is the object of this invention to achieve. The lower limit of polymerization temperature is not critical, except that polymerization becomes uneconomically slow at temperatures below about 35° C. Polymerization will usually have proceeded to economic completion in about 10 hours, at which time the unreacted monomers are vented and the polymer recovered by filtration.

It will be understood that the vinyl chloride may be polymerized along with minor proportions, say up to 15% by weight of total monomers, of other unsaturated compounds copolymerizable therewith, such as vinyl acetate, vinyl propionate, methyl methacrylate, acrylonitrile and the like. Also there may be incorporated molecular-weight-controlling agents, such as the chlorinated hydrocarbons. Particularly good results are secured by the incorporation, into the polymerization charge, of 0.5-3.0% of trichloroethylene, based on the weight of vinyl chloride.

EXAMPLES TEST METHOD

| | |
|---|---|
| Resin | 100 grams |
| Diisodecyl phthalate plasticizer | 42 grams |
| Epoxy plasticizer(1) | 6 grams |
| Calcium carbonate filler | 42.5 grams |
| Barium-cadmium stabilizer(2) | 3 grams |
| Liquid zinc stabilizer(3) | 0.5 grams |

(1)This is an epoxidized tallate ester, Admex 746, made by Ashland Chemical Company
(2)Ferro 1212A made by Ferro Chemical Company
(3)Mark PL made by Argus Chemical Company, Div. of Witco Chemical Company The resins produced in accordance with the examples below were tested for rapidity of plasticizer take-up in accordance with the following procedure. In each case the resin was made up with other ingredients in accordance with the above recipe, and stirred with a spatula to produce substantially a complete mixture of the ingredients. This mixture was then placed in a Brabender Plasti-corder, the head of the Plasti-corder adjusted to a temperature of 81° C., and the rotor set in motion. The torque on the rotor was continuously observed, and the duration of time required before the torque abruptly decreased, indicating complete sorption of the plasticizer into the resin granules, was recorded as the "dry blending time" for the resin under test.

EXAMPLE I

| EXPLORATION SERIES | |
|---|---|
| Vinyl Chloride | 100 grams |
| Trichloroethylene | 1.0 grams |
| Diisopropyl peroxy perdicarbonate | 0.08 grams |
| Methyl hydroxypropyl cellulose (Note 1) | .13 grams |
| Sorbitan monolaurate (Note 2) per Table 1 | |
| Hydroxypropyl cellulose (Note 3) per Table 1 | |

Note 1 "Methyl cellulose 65 HG", 50 centipoise, a product of Dow Chemical Company. This product contains a degree of substitution of methoxyl groups of 1.7 – 1.8, and of hydroxypropyl groups of 0.1 – 0.2.
Note 2 "Span 20", a product of Atlas Chemical Div., ICI America Inc.
Note 3 "Klucel J", a product of Hercules Inc.

A series of polymers was prepared in accordance with the foregoing recipe, varying the temperature and the amounts of the hydroxypropyl cellulose and sorbitan laurate from run to run, as set forth hereinafter in Table 1. In each case, all of the ingredients, except the vinyl chloride, trichloroethylene and diisopropyl peroxy perdicarbonate were charged into a polymerization bottle, mixed together and frozen. The vinyl chloride, trichloroethylene, and diisopropyl peroxy perdicarbonate were then charged, the vinyl chloride being in excess and allowed to evaporate down to the recipe amount in order to purge the free space in the bottle. The bottle was then closed with a crown cap, warmed up to the temperature indicated in Table 1 for the run in question, and then placed on a polymerizing wheel and tumbled in a water bath at that same temperature for 18 hrs. At the end of this time, the bottle was removed, the unpolymerized vinyl chloride vented and the polymer recovered by filtration. The "dry blending time" was then determined on this product in accordance with the test described hereinabove, and is recorded herewith in Table 1.

TABLE I

| Polymerization Temp. | Span 20 | Klucel | Dry Blending Time (minutes) | Run No. |
|---|---|---|---|---|
| 40 C. | .35 | 0 | 12.3 | (1 |
| Same | Same | .05 | 9.5 | (2 |
| Same | Same | .10 | 8.7 | (3 |
| Same | Same | .13 | 2.2 | (4 |
| Same | Same | .15 | 2.0 | (5 |
| Same | 0 | .13 | 20 | (6 |
| Same | .15 | Same | 15 | (7 |
| Same | .25 | Same | 12.9 | (8 |
| Same | .30 | Same | 10.5 | (9 |
| Same | .35 | Same | 2.1 | (10 |
| Same | .45 | Same | 2.0 | (11 |
| 35 C. | .35 | .13 | 2.0 | (12 |
| 40 C. | Same | Same | 2.1 | (13 |
| 42 C. | Same | Same | 2.2 | (14 |
| 45 C. | Same | Same | 9.0 | (15 |
| 50 C. | Same | Same | 10.5 | (16 |
| 55 C. | Same | Same | 10.0 | (17 |

From the table, it will be seen that the hydroxypropyl cellulose must be employed in an amount of at least 0.13 parts per 100 parts of vinyl chloride, note runs numbers 4 and 5 which exhibit a very desirable low dry blending time as compared with run numbers 1 to 3. Likewise, it will be apparent that the sorbitan monolaurate must be employed in an amount of at least 0.35 parts per 100 parts of the vinyl chloride, note runs numbers 10 and 11, which again show the low-dry-blending time as compared with runs 6 to 9 which show a very high-dry-blending time. It will also be seen that the temperature is very critical, note that runs numbers 12 to 14 which are below 43° C. yield desirable dry-blending-times, whereas those above this temperature range at 45° C. and above, very long dry-blending-times result.

EXAMPLE II

| LARGE SCALE PREPARATION | | |
|---|---|---|
| Vinyl Chloride | 150 | kilograms |
| Diisopropylperoxy perdicarbonate | .12 | " |
| Methyl cellulose (as in Example 1) | .19 | " |
| Hydroxypropyl cellulose (as in Example 1) | .19 | " |
| Sorbitan monolaurate (as in Example 1) | .52 | " |
| Trichloroethylene | 2.1 | " |
| Deionized water | 350 | " |

A 150 gallon reactor provided with an anchor stirrer, heating and cooling jacket, and ports for introduction and removal of reactants was provided for this preparation. Referring to the above recipe, the methyl cellulose, hydroxypropyl cellulose, and sorbitan monolaurate were charged into the reactor as 1% aqueous solutions. The trichloroethylene and water were added next, followed by the diisopropylperoxy perdicarbonate, this mixed as a 20% solution. The reactor was then sealed purged with nitrogen, and the vinyl chloride introduced. Agitation was commenced and the temperature adjusted to 40° C., this agitation and temperature being maintained throughout the reaction period. The polymerization was carried out for 14 hours, at the end of which time the pressure had dropped to 60 lbs. per square inch gauge. The unreacted monomers were vented and the charge dropped and filtered to recover the resin product. This product had a dry-blendingtime of 1.25 minutes. Conversion of the monomers in the run was approximately 92%.

What is claimed is:

1. Process of producing vinyl chloride resin characterized by rapid plasticizer sorption, wherein

|  | Parts by Weight |
|---|---|
| Vinyl chloride | 100 |
| Is dispersed | |
| at all times as the internal phase in an aqueous medium | 60 – 200 |
| said aqueous medium consisting essentially of water and | |
| Hydroxypropyl Cellulose having 3-4 molecules of propylene oxide and no other substituent, combined per anhydro glucose unit, and having a viscosity of 50–1000 centipoises in 5% aqueous solution | 0.11 to 0.60 |
| A sorbitan fatty ester of a fatty acid containing 8-20 carbon atoms and | 0.33 to 1.5 |
| Hydroxypropyl methyl cellulose | Up to an amount such that the sum of hydroxypropyl cellulose, sorbitan fatty ester and hydroxypropyl methyl cellulose constitutes .44 to 1.5 parts by weight per 100 parts by weight of vinyl chloride |

And said vinyl chloride is polymerized in the presence of a free-radical catalyst soluble in the vinyl chloride at temperatures at all times not greater than 43° C.

2. Process according to claim 1 wherein the aqueous medium contains, in addition to the hydroxypropyl cellulose, 0.03–0.20 parts of hydroxypropyl methyl cellulose.

3. Process according to claim 1 wherein the hydroxypropyl cellulose amounts to approximately 0.13 parts and the sorbitan fatty ester amounts to approximately 0.35 parts.

4. Process according to claim 2 wherein the polymerization mass contains, in addition to the other ingredients, 0.5–3.0 parts of trichloroethylene.

* * * * *